INVENTOR.
Garman O. Kimmell
BY
Earl Babcock

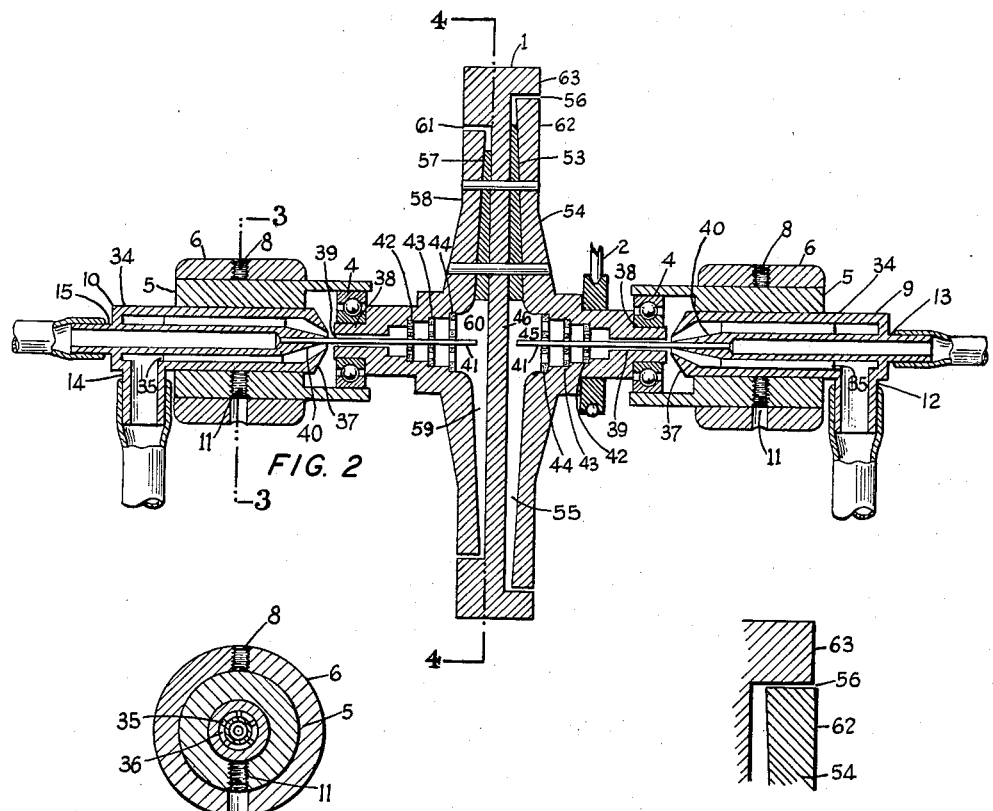

United States Patent Office 3,002,373
Patented Oct. 3, 1961

3,002,373
GAS GRAVITOMETERS
Garman O. Kimmell, 52 NW. 42nd St.,
Oklahoma City, Okla.
Filed Sept. 27, 1957, Ser. No. 686,664
13 Claims. (Cl. 73—30)

This invention relates to a gas gravitometer of extreme sensitivity and accuracy, and particularly to an indicating specific gravity type gravitometer which compares the unknown density of a gas to that of air.

Many devices for measuring the density of fluids or comparing the relative densities of two fluids have been proposed, but only a few have been applied as basic test instruments. Such devices include the differential-pressure density meter, the gas density balance, the viscous drag type density meter, and static pressure devices employing one or two fans. The more reliable of these devices require considerable manipulation and are time consuming. Some require the use of additional instruments such as thermometers and barometers. The viscous drag and static pressure devices in general use are empirical in nature and require careful calibration. These devices are subject to errors due to friction, viscosity, temperature changes, and changes in barometric pressure.

It is, therefore, one object of the present invention to provide an indicating gravitometer to which the basic principles of physics can be applied without mechanical limitations or allowances.

Another object of the invention is to provide an indicating gravitometer which is unaffected by the viscosity of the gas to be tested.

Still another object of the invention is to provide an indicating gravitometer which is frictionless with respect to the measuring means.

A still further object of the invention is to provide an indicating gravitometer which by reason of its construction and application of basic principles, completely corrects for temperature and the primary effects of changes in barometric pressure.

A still further object of the invention is to provide an instrument to which the basic principles can be applied in such a way that it needs no calibration.

An important object of the invention is to eliminate all seals and stuffing boxes. Any point of friction or turbulence generates heat and produces large errors. It should be pointed out that for a specific gravity instrument to indicate to an accuracy of 0.5 percent, temperature effects between the sample gas and reference air must be controlled to the close tolerance of plus or minus 0.13 degree F.

Another important object of the invention is to provide an instrument requiring only a very small sample of gas, the specific gravity of which will be rapidly indicated.

With the preceding and other objects in mind, the invention resides in the combination and arrangement of parts, in the application of basic principles to these parts, and to the details of construction described and claimed. In the drawings wherein like numerals of reference designate corresponding parts:

FIGURE 2 is a longitudinal cross-section taken along the lines 2—2 of FIGURES 1 and 4.

FIGURE 3 is a normal cross-sectional view taken along the lines 3—3 of FIGURES 1 and 2.

FIGURE 4 is a partial section through the centrifuge taken along the line 4—4 of FIGURE 2.

FIGURE 5 is an enlarged cross-sectional detail of the slot of FIGURE 2.

FIGURE 6 is an enlarged perspective view partly in section of the hub of the centrifuge taken along the line 6—6 of FIGURE 4.

Figure 1:
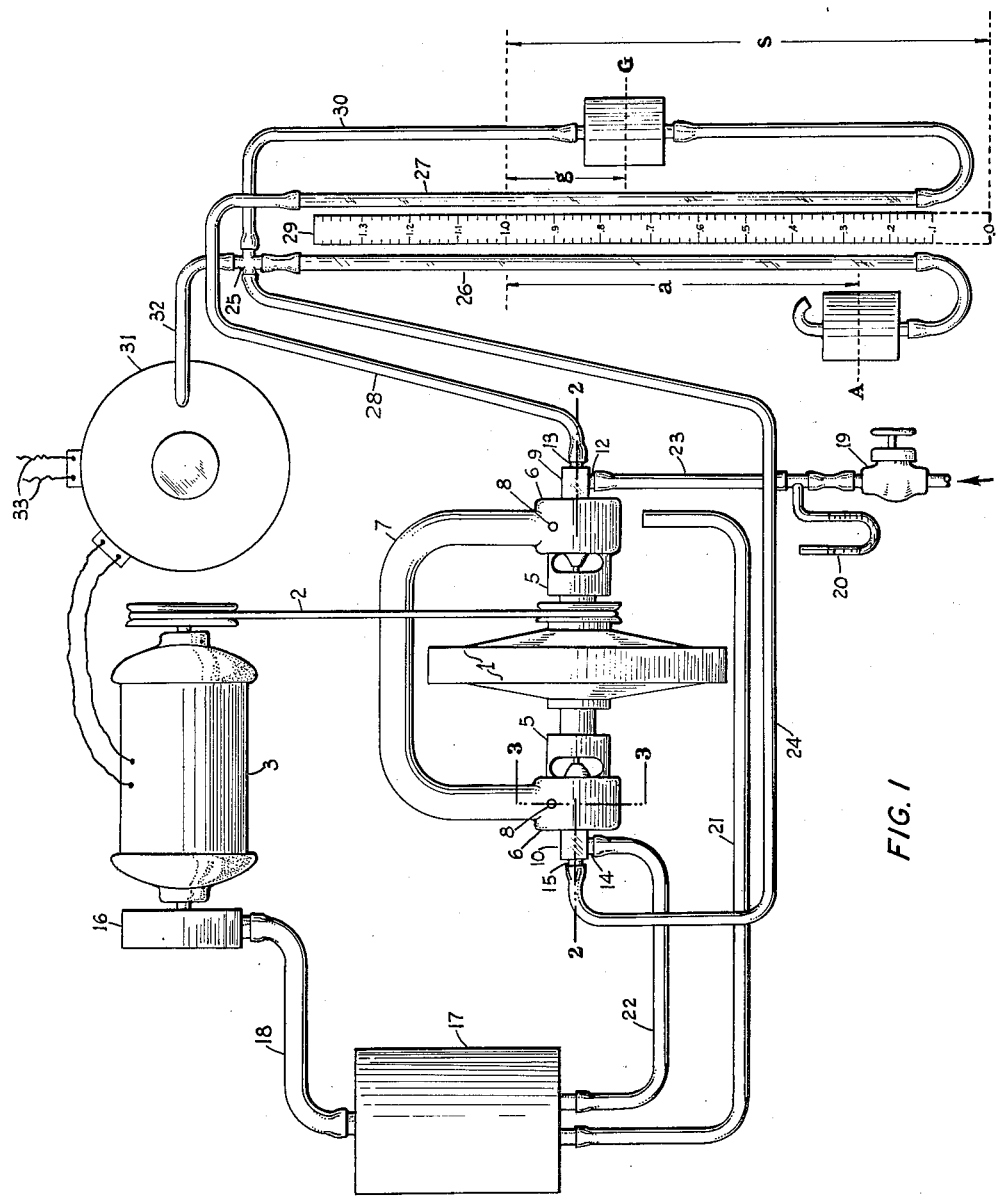
FIGURE 1 is a diagrammatic illustration of the gravitometer incorporating the invention.

Referring to the drawings, and first to the assembly shown in FIGURE 1, the reference character 1 designates a hollow wheel which in operation, performs as a pair of true centrifuges. To eliminate any difference in temperature between the centrifuges, they are placed back to back and incorporated in a substantial wheel of high thermal conductivity such as brass or aluminum. Wheel 1 is driven through a belt 2 by any suitable power means, but preferably by an electric motor as shown at 3. The hub of the wheel rotates on two anti-friction bearings 4 (see FIGURE 2) retained in combination bearing and lance housings 5. The housings 5 are supported in cylindrical end portions 6 of a yoke 7 and are secured therein with set screws 8. Sample lance assembly 9 and air lance assembly 10 extend axially through housings 5 and are held in postion by set screws 11 (see FIGURE 2).

Sample lance assembly 9 has a sample feed connection 12 and a sample pressure connection 13. Air lance assembly 10 likewise has two tube connections, an air feed connection 14 and an air pressure connection 15.

Reference air can be supplied to the centrifuges from any clean dry air source but to make the instrument self-contained, a small blower 16 is attached to the opposite end of the shaft of motor 3. Blower 16 discharges into an air-drier 17 through the tube 18. A sample of gas to be tested is supplied to the instrument through a metering valve 19. A manometer 20, connected to the discharge side of the metering valve 19, is used to adjust the gas sample feed pressure.

For purposes of zeroing the instrument, dry air from the air-drier 17 can be supplied to both centrifuges through tubes 21 and 22. Tube 21 is shown disconnected, but can be interchanged on the sample feed connection 12 with a gas sample tube 23.

Air pressure connection 15 is connected through a tube 24 and a cross 25 to the top leg of the well-type air manometer 26. The well of manometer 26 is adjustable and is open to atmosphere. Sample pressure connection 13 is connected directly to the top leg of the well-type sample manometer 27 through the tube 28. The well of manometer 27 is also adjustable.

The legs of manometers 26 and 27 are disposed on opposite sides of a scale 29. The third branch of cross 25 is connected to the well of manometer 27 through the tube 30. The fourth branch of cross 25 is connected to a presure controller 31 through tube 32. Pressure controller 31 is not essential to the satisfactory operation of the instrument, but is included and described as an element contributing to easy and rapid operation. Pressure controller 31 is any suitable pressure transducer capable in its operation of adjusting the speed of motor 3 to hold a given pressure on manometer 26. A substitution for the pressure controller 31 would be a simple rheostat in the electric supply lines 33.

Lance assemblies 9 and 10, shown in detail in FIGURE 2, are structurally identical so sample lance assembly 9 only will be described. Pressure connection 13 extends axially through tubular portion 34 and is supported radially therein by fins 35 (see FIGURE 3). The annular passageways 36, formed between fins 35, provide communication between feed connection 12 and a sharp edged nozzle 37 formed in an extension of the tubular portion 34 of the lance assembly. Each hub of the wheel 1 is hollow. Nozzle 37 is spaced very closely to, but does not touch, the hub extension 38 engaging the inner race of the anti-friction bearing 4. Sample gas or dry air is supplied to the centrifuge under a slight positive pressure through the feed connection 12, passageways 36, nozzle 37, and a regulating device having an orifice 39 in the hub extension 38. Only a fraction of the volume of gas used in the centrifuge is lost between the sharp edged nozzle 37 and the outer face of the hub extension 38. This construction eliminates friction and an otherwise necessary seal but provides protection against contamination of the sample gas even at very low positive feed pressures. A satisfactory spacing between nozzle 37 and the face of hub extension 38 is about .002 inch, and a satisfactory feed pressure is 1.5 to 2.0 pounds per square foot.

Pressure connection 13 terminates in a conical portion 40 proximate orifice 39. Supported and sealed in the conical end portion 40 is a small pressure sensing tube 41 which passes centrally through nozzle 37, orifice 39, diffusion discs 42, 43, and 44, and into chamber 45 adjacent the center plate 46 of wheel 1. Central holes 47, 48 and 49 in diffusion discs 42, 43 and 44 are approximately the same diameter as orifice 39. Ports 50, 51 and 52 in diffusion discs 42, 43 and 44 increase in size in proportion to the diameters of the discs and are staggered so that the flow through them is interrupted (see FIGURE 6). Diffusion discs 42, 43 and 44 dissipate the high velocity of gas leaving orifice 39 to reduce impact and inspirational effects on the open end of tube 41.

It will thus be seen that, during operation, the two legs of manometers 26 and 27 are connected respectively, by the tubes 24 and 28 and the connections 15 and 13 to the two small tubes 41. Thus the manometer 26 is responsive to and indicates the pressure induced in chamber 60, and manometer 27 is responsive to and indicates the difference in pressures induced in the chambers 45 and 60 while the wheel 1 is rotating, and while the sample and reference gases are being supplied to the chambers through the orifices 39.

Wedged shaped spacers 53 separate sample housings 54 from the center plate 46 of wheel 1. A radially narrowing wafer shaped passageway 55 is thus formed between chamber 45 and the slot 56. Slot 56 is a very narrow cylindrically shaped communication between the end of passageway 55 and the atmosphere, of sufficient length that it acts not as an orifice but as a capillary tube. Likewise, spacers 57 separate air housing 58 from the center plate 46 of wheel 1 forming a radially narrowing wafer shaped passageway 59 between chamber 60 and the slot 61. Slot 61 is a very narrow cylindrically shaped communication between the end of passageway 59 and the atmosphere. The thin cylindrical slot defines the radius of the centrifuge and provides a means of accurately establishing an atmospheric reference pressure unaffected by impact or inspiration. The slot also acts as a positive barrier against the entry of ambient air. The importance of the functioning of the slot is emphasized by considering the angular velocities involved. Slots 56 and 61 are shown as having different diameters. The function of the different diameters will be explained later in detail.

The flat portion of sample housing 54, shown at 62 in FIGURE 5, is elevated slightly over the rim portion 63 of wheel 1 to neutralize the effects of flow of ambient air across the slot. Parasitical drag on the surfaces of wheel 1 rotates a layer of air in contact with it which in turn flows outwardly due to centrifugal force.

If a right circular cylinder of fluid is rotated on its axis, a pressure gradient exists along any radial line of the cylinder. If P represents the total pressure difference along the gradient in pounds per square foot, $$P = \frac{Mr^2\omega^2}{2} \quad (1)$$

in which $M$ = density of fluid in the centrifuge, #/ft.³
$r$ = radius, feet
$\omega$ = angular velocity, rad./sec.

The pressure gradient along $r$ has the effect of expanding or decompressing the gas in the centrifuge. The use of a hypothetically non-compressible gas in the centrifuge would indicate a different pressure which will be denoted by S. Thus if $\overline{M}$ is the density of the non-compressible gas, $$S = \frac{\overline{M}r^2\omega^2}{2} \quad (2)$$

By simple integration it can be shown that the average effective decompression in the centrifuge is two-thirds of the total pressure difference along the gradient. The density of a perfect gas in a system varies as the absolute pressure so denoting barometric pressure in pounds per square foot by B, $$\frac{M}{\overline{M}} = \frac{B - \frac{2}{3}P}{B} \quad (3)$$

Dividing (1) by (2) gives, $$\frac{P}{S} = \frac{M}{\overline{M}} \quad (4)$$

Substituting (4) in (3) and solving for S, $$\frac{P}{S} = \frac{B - \frac{2}{3}P}{B} \text{ or } S = \frac{BP}{B - \frac{2}{3}P} \quad (5)$$

Equating (2) and (5), $$\frac{\overline{M}r^2\omega^2}{2} = \frac{PB}{B - \frac{2}{3}P} \quad (6)$$

Assigning subscripts $a$ and $g$ relating to the air reference and sample centrifuges respectively, (6) becomes, $$\frac{BP_g}{B - \frac{2}{3}P_g} = \frac{\overline{M}_g r_g^2 \omega^2}{2} \quad (7)$$

and, $$\frac{BP_a}{B - \frac{2}{3}P_a} = \frac{\overline{M}_a r_a^2 \omega^2}{2} \quad (8)$$

Both centrifuges run at the same speed so diving Equation 7 by Equation 8 and cancelling, $$\frac{P_g}{P_a}\left(\frac{B - \frac{2}{3}P_a}{B - \frac{2}{3}P_g}\right) = \frac{\overline{M}_g r_g^2}{\overline{M}_a r_a^2} \quad (9)$$

When $\overline{M}_a = 1$, $\overline{M}_g$ is specific gravity G by definition and Equation 9 may be written, $$\frac{P_g}{P_a}\left(\frac{B - \frac{2}{3}P_a}{B - \frac{2}{3}P_g}\right) = G\left(\frac{r_g^2}{r_a^2}\right)$$

or, $$G = \frac{P_g}{P_a}\left(\frac{r_a^2}{r_g^2}\right)\left(\frac{B - \frac{2}{3}P_a}{B - \frac{2}{3}P_g}\right) \quad (10)$$

which is the basic equation for the gravitometer.

When dry air is supplied to both centrifuges, the value of G is 1.0. Denoting the total pressure gradient produced by the sample centrifuge when supplied with dry air as $P_g'$, Equation 10 becomes, $$1 = \frac{P_g'}{P_a}\left(\frac{r_a^2}{r_g^2}\right)\left(\frac{B-\frac{2}{3}P_a}{B-\frac{2}{3}P_g'}\right) \quad (11)$$

Dividing Equation 10 by Equation 11 and cancelling, $$G = \frac{P_g}{P_g'}\left(\frac{B-\frac{2}{3}P_g'}{B-\frac{2}{3}P_g}\right) \quad (12)$$

It is difficult to use Equation 12 directly as a scale correction for decompression. If the differential decompresion is compensated at unity specific gravity by assigning a unity gravity scale length or 1.0 to $P_g'$, then $P_g$ becomes the indicated gravity $G'$ on a linear scale and, $$G = G'\left(\frac{B'-\frac{2}{3}G'}{B'-\frac{2}{3}}\right) \quad (13)$$

in which $B'$ is the barometric pressure in unity gravity units of head pressure. Note that in Equation 13, $G=G'$ at $G'=0$ and $G'=1.0$.

The divisions on scale 29 opposite the leg of sample manometer 27 are not linear but are tempered on the basis of Equation 13. The divisions on scale 29 opposite the leg of air manometer 26 are likewise not linear but are tempered on the basis of, $$1-G = 1-G'\left(\frac{B'-\frac{2}{3}G'}{B'-\frac{2}{3}}\right) \quad (14)$$

which will be explained later. Barometric pressure appears in Equations 13 and 14 but over normal variations has an insignificant effect.

If $P_g'$ is assigned a value of 68.5 #/ft.², scale 29 would have a unity gravity length, or length between specific gravity zero and unity, of 15 inches using a 30° A.P.I. oil in the manometers. If the barometric pressure is assumed to be 2000 #/ft.² or approximately 29.3 inches of mercury, a maximum error of only .05 percent of full scale would result from a change in barometric pressure of plus or minus two inches of mercury. The error would be a maximum at 0.5 specific gravity diminishing to zero at 0.0 and 1.0 specific gravity.

The velocity of flow through passageway 55 is so low that the resulting presure drop can be disregarded as it is less than .001 inch of head on the manometers. The combined effect of impact and inspiration on the open end of tube 41 is less than .001 inch of head on the manometers and can be disregarded. Pressure drop through the centrifuges can, therefore, be considered as a linear function of specific gravity which has the singular effect of changing the length of scale 29.

Though the ratio of the radius of slot 61 to the radius of slot 56 can be chosen to suit any specified range of specific gravity, a ratio of radii of approximately 0.84 as shown is applied best to a specific gravity range of 0.5 to 1.0. A differential hook-up on manometer 27 as shown in FIGURE 1 accomplishes two important functions; (1) reduces the effect of changes in speed of the centrifuges on manometer 27 as examination of Equation 10 will show and 2 permits the use of a longer graduation on the scale 29. When operated on dry air, the sample centrifuge produces a negative pressure of one unit of gravity or a head of liquid of height "s" as shown in FIGURE 1. At the same time the air centrifuge produces a negative pressure of a head of liquid of height "a". The ratio R of the gravitometer is defined as the ratio of pressures produced by the air and sample centrifuges, or $$R = \frac{P_a}{P_g} \quad (18)$$

To determine this ratio, which in effect is zeroing the differential manometers, both centrifuges are supplied with dry air. The wells of manometers 26 and 27 are adjusted so that at a given speed both liquid columns indicate 1.0 on scale 29. If wheel 1 is then stopped, the air centrifuge would have produced a negative pressure on manometer 26 indicated by "a". Because of the differential hook-up on manometer 27, the sample centrifuge would have produced a negative pressure "s" equal to the sum of "a" and "g" and which is indicated on differential manometer 27 as "g". "s" is unity gravity scale length and the scale value of "g" is tempered according to Equation 13. The tempered scale value of "a" plus the tempered scale value of "g" must be equal to unity, hence Equation 14.

Denoting A as the scale reading of manometer 26 at rest, the scale value of head pressure "a" would be.

$$a = 1-A \quad (19)$$

Denoting G as the scale reading of manometer 27 at rest, the scale value of the indicated pressure "g" would be, $$g = 1-G \quad (20)$$

From Equation 18, $$R = \frac{P_a}{P_g} = \frac{a}{a+g} \quad (21)$$

Substituting (19) and (20) in Equation 21, $$R = \frac{1-A}{(1-A)+(1-G)} = \frac{1-A}{2-A-G} \quad (22)$$

If the value of R as obtained from Equation 22 is set on the scale by adjusting the well of manometer 26, and the value of $(1-R)$ is set on the scale by adjusting the well of manometer 27, the gravitometer is zeroed and ready to use. This ratio can always be checked by running both centrifuges on dry air. If both manometer columns read 1.0, the gravitometer is zeroed and in order. Certain errors result in substituting tempered scale readings in Equation 22 but it can be shown that these errors are compensated by setting the calculated values back on the same tempered scales.

In the normal operation of the gravitometer, it is only necessary to feed a sample of the gas to be tested to the sample centrifuge under a slight positive pressure as indicated by the sample pressure manometer 20 and at the same time adjusting the speed of wheel 1 to cause manometer 26 to read 1.0. The specific gravity of the gas sample is read directly from the scale opposite the column of liquid in the leg of manometer 27.

Effects of ambient temperature on both gas and air and on the liquid in the manometers together with the primary effects of barometric pressure are perfectly corrected. Reference air density is effected by changes in temperature and barometric pressure, but these effects change the density of the sample gas an identical amount. Speed of the centrifuges is simply adjusted to compensate for these variations. Note that neither speed nor absolute density terms appear in the basic Equation 10 for the gravitometer.

Attention is called to the fact that the gravitometer centrifuges consist of only one rotating assembly which is free of any contact with any of its functional parts except the antifriction bearings on which it runs, and also that the pressure sensing means employed is completely frictionless during the time of specific gravity indication.

While only one embodiment of the invention has been shown and described, it is obvious that various changes may be made without departing from the spirit of the invention or the scope of the annexed claims. For example, if proper precautions are taken to prevent differences in temperature between the sample and air centrifuges, they can be disposed on opposite ends of the shaft of a motor directly or on opposite ends of a driven shaft. Also the diffusion discs 42, 43 and 44 can be eliminated if the position of the open end of tube 41 is very carefully chosen. High velocity gas from orifice 39 produces a slight impact pressure on the face of center plate 46. The effect of the velocity of the gas closer to the orifice is to produce an inspiration pressure, so a very narrow region does exist in which impact and inspirational effects essentially cancel.

I claim:

1. A gas gravitometer of the character described including in combination a gas sample centrifuge and a reference gas centrifuge driven at the same speed, each of said centrifuges having a hollow hub, regulating devices having orifices for feeding the gases to the centrifuges, said regulating devices being located in the hubs of the centrifuges, and so arranged that the flow of gases to the centrifuges is determined by the total pressure gradient within the centrifuges, cylindrical discharge slots from both centrifuges, said slots being small so as to function as capillaries, pressure sensing tubes passing through the orifices of said regulating devices into the center of the centrifuges, means for supplying sample gas to one centrifuge through the annulus between its regulating devices and its pressure sensing tube, means for supplying reference gas to the other centrifuge through the annulus between its regulating devices and its pressure sensing tube, and means connected to said pressure sensing tubes for measuring the pressures in the centrifuges.

2. A gas gravitometer defined in claim 1 in which the hollow hub of each centrifuge is provided with diffusion discs.

3. A gas gravitometer defined in claim 1 in which surfaces extending at right angles from the discharge end of each of said slots are offset from one another.

4. A gas gravitometer defined in claim 1 in which the radius of the cylindrical discharge slot of the reference gas centrifuge is different than the radius of the cylindrical discharge slot of the gas sample centrifuge.

5. A gas gravitometer including, in combination, two centrifuges, one for an unknown gas sample and one for a reference gas sample and means for rotating the two centrifuges at the same speed, each of said centrifuges consisting of a hollow wheel having a hollow hub and a cylindrical discharge slot near its outer rim, each of said hubs having a regulating device with an orifice for feeding the gas to its hollow wheel, pressure sensing tubes passing through the orifices in said hubs into the centers of said hollow wheels, means including nozzles slightly spaced from said hubs for supplying the gases to the regulating devices, and means connected to the pressure sensing tubes for measuring the differential pressure in the hollow wheels while they are being rotated.

6. A gas gravitometer defined in claim 5 in which the hollow hub of each centrifuge is provided with diffusion discs.

7. A gas gravitometer defined in claim 5 in which surfaces extending at right angles from the discharge end of the slot are offset from one another.

8. A gas gravitometer defined in claim 5 in which the radius of the cylindrical discharge slot of the reference gas centrifuge is less than the radius of the cylindrical discharge slot of the gas sample centrifuge by a predetermined amount.

9. A gas gravitometer comprising in combination, a structure provided with two similar centrifuge wheels, each having a hollow hub and having chambers adapted to receive, respectively, a gas of known density and a gas of unknown density, means for rotating said structure to impart centrifugal forces to the gases therein, regulating devices having orifices in the hollow hubs for supplying gases to the chambers, discharge slots near the rim of the structure for causing the gases to flow from the regulating devices through the chambers as the structure is rotated, and means including pressure sensing tubes extending through the orifices of the regulating devices and into the chambers for measuring the pressures in the chambers.

10. In a gas gravitometer, a pair of centrifuges, each comprising a hollow wheel having a hollow hub and a discharge slot near its outer rim, a yoke having bearings for supporting the hubs of said wheels, each of said hubs having an orifice through which gas passes to the center of each wheel, nozzles mounted in said yoke, one for each of said hubs, adjacent the orifices thereof but spaced slightly from said hubs, and means for supplying gases under positive pressure to said nozzles thereby causing the gases to enter the hollow wheels through the orifices in said hollow hubs.

11. The arrangement defined in claim 10 in combination with a pressure sensing tube extending through the orifice.

12. The arrangement defined in claim 10 in combination with a pressure sensing tube extending through each of the orifices and means within the hollow hub and around said pressure sensing tube for diffusing the gas supplied thereto through the orifice.

13. The arrangement defined in claim 10 in combination with means in each of said hollow hubs for diffusing the gas supplied thereto through the orifice.

References Cited in the file of this patent

UNITED STATES PATENTS

| | | |
|---|---|---|
| 1,644,684 | Linderman | Oct. 11, 1927 |
| 2,847,850 | Spink | Aug. 19, 1958 |

FOREIGN PATENTS

| | | |
|---|---|---|
| 227,671 | Great Britain | Jan. 22, 1925 |
| 445,432 | Great Britain | Apr. 9, 1936 |